(12) United States Patent
Strom et al.

(10) Patent No.: US 9,478,069 B2
(45) Date of Patent: Oct. 25, 2016

(54) COMPRESSION FORMAT CONVERSION FOR TEXTURE DATA

(71) Applicant: ST-Ericsson SA, Plan-les-Ouates (CH)

(72) Inventors: Jacob Strom, Stockholm (SE); Jim Rasmusson, Vellinge (SE); Gilles Ries, Saint-jean de Moirans (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 289 days.

(21) Appl. No.: 14/362,326

(22) PCT Filed: Jan. 22, 2013

(86) PCT No.: PCT/EP2013/051083
§ 371 (c)(1),
(2) Date: Jun. 2, 2014

(87) PCT Pub. No.: WO2013/110579
PCT Pub. Date: Aug. 1, 2013

(65) Prior Publication Data
US 2014/0327668 A1  Nov. 6, 2014

Related U.S. Application Data

(60) Provisional application No. 61/595,303, filed on Feb. 6, 2012.

(30) Foreign Application Priority Data

Jan. 25, 2012 (EP) .................................... 12152512
Jan. 26, 2012 (EP) .................................... 12305103

(51) Int. Cl.
*G06T 19/20* (2011.01)
*G06T 17/00* (2006.01)
*G06T 9/00* (2006.01)

(52) U.S. Cl.
CPC ................. *G06T 19/20* (2013.01); *G06T 9/00* (2013.01); *G06T 17/00* (2013.01); *G06T 2210/32* (2013.01); *G06T 2219/2012* (2013.01)

(58) Field of Classification Search
None
See application file for complete search history.

(56) References Cited

PUBLICATIONS

Ogniewski, Jens, Andréas Karlsson, and Ingemar Ragnemalm. "Texture Compression in Memory-and Performance-Constrained Embedded Systems." Computer Graphics, Visualization, Computer Vision and Image Processing 2011.*
Olano, Marc, et al. "Variable bit rate GPU texture decompression." Computer Graphics Forum. vol. 30. No. 4. Blackwell Publishing Ltd, 2011.*
International Search Report issued in corresponding International application No. PCT/EP2013/051083, date of mailing Feb. 19, 2013.

(Continued)

*Primary Examiner* — Zhengxi Liu
(74) *Attorney, Agent, or Firm* — Patent Portfolio Builders PLLC

(57) ABSTRACT

A conversion between two texture compression formats comprises calculations performed at index-level for reducing handling of values with color bit-length and an amount of calculations with color values. Format conversion can thus be performed in real time upon displaying an image using the compressed texture data, without significant slowing down of a display rate of the images. It may be implemented in particular for conversion from DXT1—to ETC1 compression format, and a non-flipped or flipped orientation of an ETC1—compressed texture data block can thus be determined from said texture data block as initially compressed in DXT1 format.

15 Claims, 5 Drawing Sheets

(56) References Cited

PUBLICATIONS

Written Opinion of the International Searching Authority issued in corresponding International application No. PCT/EP2013/051083, date of mailing Feb. 19, 2013.

Extended European Search Report issued in corresponding European application No. EP 12 30 5103, date of completion Jul. 23, 2012.

Ström, Jacob et al., "Lossless Compression of Already Compressed Textures," Proceedings HPG '11, Proceedings of the ACM SIGGRAPH Symposium on High Performance Graphics, Vancouver, British Columbia, Canada, Aug. 5, 2011, pp. 177-182, XP055032639, New York, NY, USA.

Ström, Jacob et al., "iPackman: High-Quality, Low-Complexity Texture Compression for Mobile Phones," HWWS '05, Proceedings of the ACM SIGGRAPH/EUROGRAPHICS conference/workshop on Graphics Hardware, pp. 63-70, Los Angeles, CA, USA, Jul. 30, 2005, XP001152003, ISBN: 1-59593-086-8, DOI: 10.1145/1071866.1071877, New York, NY, USA.

Ivanov, Denis V., "Color Distribution—a new approach to texture compression," Computer Graphics Forum, Wiley-Blackwell Publishing Ltd., GB, vol. 19, Issue 3, Aug. 21, 2000, pp. 283-290, XP009008909, ISSN: 0167-7055, DOI: 10.1111/1467-8659.00420.

\* cited by examiner

Calculation of sum left, sum right, sum top and sum bot 1. out_a     = (in <<1) & 0xaaaaaaaa
2. out_b     = (in ^ (in >>1)) & 0x55555555
              xor
3. out       = out_a | out_b
              or
4. sum1      = (out & 0x00cc00cc) + ((out >> 8) & 0x00cc00cc)
5. sum2      = (out & 0x33003300) + ((out << 8) & 0x33003300)
6. res       = (sum1 >> 2) + (sum2 >> 8)
7. sum left  = ((res >> 20) & 0xf) + ((res >> 4) & 0xf)
8. sum right = ((res >> 16) & 0xf) + (res & 0xf)
9. sum top   = ((res >> 20) & 0xf) + ((res >> 16) & 0xf)
10. sum bot  = ((res >> 4) & 0xf) + (res & 0xf)

FIG. 5

Calculation of sum left, sum right, sum top and sum bot

□ = 0

| | | | | | | | | | | | | | | | | |
|---|---|---|---|---|---|---|---|---|---|---|---|---|---|---|---|---|
| in | $\hat{a}_{11}\hat{b}_{11}$ | $\hat{a}_{12}\hat{b}_{12}$ | $\hat{a}_{13}\hat{b}_{13}$ | $\hat{a}_{14}\hat{b}_{14}$ | $\hat{a}_{21}\hat{b}_{21}$ | $\hat{a}_{22}\hat{b}_{22}$ | $\hat{a}_{23}\hat{b}_{23}$ | $\hat{a}_{24}\hat{b}_{24}$ | $\hat{a}_{31}\hat{b}_{31}$ | $\hat{a}_{32}\hat{b}_{32}$ | $\hat{a}_{33}\hat{b}_{33}$ | $\hat{a}_{34}\hat{b}_{34}$ | $\hat{a}_{41}\hat{b}_{41}$ | $\hat{a}_{42}\hat{b}_{42}$ | $\hat{a}_{43}\hat{b}_{43}$ | $\hat{a}_{44}\hat{b}_{44}$ | a= 1 0 1 0
5= 0 1 0 1 out_a: $a_{11}, a_{12}, a_{13}, a_{14}, a_{21}, a_{22}, a_{23}, a_{24}, a_{31}, a_{32}, a_{33}, a_{34}, a_{41}, a_{42}, a_{43}, a_{44}$   = (in << 1) & 0xaaaaaaaa   ← 702 out_b: $b_{11}, b_{12}, b_{13}, b_{14}, b_{21}, b_{22}, b_{23}, b_{24}, b_{31}, b_{32}, b_{33}, b_{34}, b_{41}, b_{42}, b_{43}, b_{44}$   = (in ^ (in >> 1)) & 0x55555555   ← 704 xor
 or out: $a_{11}b_{11}, a_{12}, a_{13}b_{13}, a_{14}, a_{21}, a_{22}b_{22}, a_{23}, a_{24}b_{24}, a_{31}b_{31}, a_{32}, a_{33}b_{33}, a_{34}, a_{41}, a_{42}b_{42}, a_{43}b_{43}, a_{44}$   = out_a | out_b temp1 = (out >> 8) & 0x00cc00cc temp2 = (out << 8) & 0x33003300 sum1 = (out & 0x00cc00cc) + temp1 sum2 = (out & 0x33003300) + temp2 res = (sum1 >> 2) + (sum2 >> 8)

sum right = ((res >> 20) & 0xf) + ((res >> 4) & 0xf)

sum left = ((res >> 16) & 0xf) + (res & 0xf)

sum bot = ((res >> 20) & 0xf) + ((res >> 16) & 0xf)

sum top = ((res >> 4) & 0xf) + (res & 0xf)

FIG. 8

Convert_and_sum_table:

| X | $\hat{a}_1\ \hat{b}_1\ \hat{a}_2\ \hat{b}_2$ | $a_1\ b_1\ a_2\ b_2$ | $i_1$ | $i_2$ | Convert_and_sum[x] |
|---|---|---|---|---|---|
| 0 | 0 0 0 0 | 0 0 0 0 | 0 | 0 | 0 |
| 1 | 0 0 0 1 | 0 0 0 1 | 0 | 3 | 3 |
| 2 | 0 0 1 0 | 0 0 1 1 | 0 | 1 | 1 |
| 3 | 0 0 1 1 | 0 0 1 0 | 0 | 2 | 2 |
| 4 | 0 1 0 0 | 0 1 1 1 | 3 | 0 | 3 |
| 5 | 0 1 0 1 | 0 1 1 0 | 3 | 3 | 6 |
| 6 | 0 1 1 0 | 0 1 0 1 | 3 | 1 | 4 |
| 7 | 0 1 1 1 | 0 1 0 0 | 3 | 2 | 5 |
| 8 | 1 0 0 0 | 1 1 0 1 | 1 | 0 | 1 |
| 9 | 1 0 0 1 | 1 1 0 0 | 1 | 3 | 4 |
| 10 | 1 0 1 0 | 1 1 1 1 | 1 | 1 | 2 |
| 11 | 1 0 1 1 | 1 1 1 0 | 1 | 2 | 3 |
| 12 | 1 1 0 0 | 1 0 0 1 | 2 | 0 | 2 |
| 13 | 1 1 0 1 | 1 0 0 0 | 2 | 3 | 5 |
| 14 | 1 1 1 0 | 1 0 1 1 | 2 | 1 | 3 |
| 15 | 1 1 1 1 | 1 0 1 0 | 2 | 2 | 4 |
| Left pixel original index bits | Right pixel original index bits | Left pixel converted index bits | Value of converted index bits for left pixel | | Sum of $i_1$ and $i_2$ |

801

COMPRESSION FORMAT CONVERSION FOR TEXTURE DATA

The invention relates to conversion between two compression formats for texture data.

BACKGROUND OF THE INVENTION

ETC1 standing for Ericsson Texture Compression, version 1, is a texture compression scheme which is implemented in many devices such as mobile phone and touchpad devices. It has been optimized initially for efficient hardware-implementation, in particular for texture data decompression.

But there is a need for these devices to be also able to handle texture data which is compressed using DXT1, standing for DirectX Texture Compression, codec 1. To this end, DTX1-compressed texture data which is received is to be converted into ETC1 format, before being decompressed according to this latter compression format. But such conversion must be rapid enough for not slowing down the image display rate significantly.

One object of the present invention is therefore to provide rapid conversion for texture data, from a first compression format to a second one.

In particular, the invention aims at converting texture data from first to second compression format while minimizing handling of color values which are encoded with full color bit-length.

SUMMARY OF THE INVENTION

To this end, the invention proposes a computer-readable storage medium for storing computer-executable instructions, that when executed, cause one or more processors to perform acts to convert texture data from a first compression format to a second compression format. A texture data block in the first compression format comprises a set of first index values which are suitable for calculating color values. A bit number is allocated in this first compression format for encoding each first index value, where the bit number is less than a color bit-length used for encoding one color value. For example, a color value may be encoded using three 8-bit values, or three 4-bit values, corresponding to RGB (Red-Green-Blue) coordinates, thus forming a color bit-length of 24 bits, or 12 bits, whereas each first index value may be only two bits in length.

According to the invention, the computer-executable instructions are suitable for running an algorithm with at least one index-combining operation which is executed at index-level, for deriving at least one feature of the texture data block within the second compression format from the set of first index values of the texture data block within the first compression format. Operation at index-level means that no color value which is encoded with the color bit-length is handled for this operation, at least for deriving the feature of concern for the texture data block in the second compression format.

In addition, within the context of the present invention, index-combining operation means that at least two initial index values are combined with each other for obtaining another index value which forms the operation result. Thus, an index-combining operation is not an index conversion, since an index conversion only assigns a new index value to each initial index value separately, without combining two index values or more. However, an index-combining operation may start with converting each index value involved in the operation, and then combining the converted index values with each other for obtaining the operation result. Also, an index-combining operation may be implemented with index values which have been converted beforehand in a separate prior step.

Thus, the feature of the texture data block in the second compression format is obtained at least partially by handling values which are encoded with the bit number of the first indices, which leads to rapid computations. This limits the amount of residual calculations to be carried out with the color bit-length. Thus, the compression format conversion can be performed in real time without significant loss in the image display rate.

Preferably, the whole algorithm may be at index-level for obtaining the feature of the texture data block within the second compression format from the set of first index values of the same texture data block within the first compression format. Put another way, the feature of concern can be derived only by executing operations at index-level, without handling color values which are encoded with the color bit-length.

The computer-readable storage medium of the invention may be specially adapted for being incorporated in a mobile phone or touchpad device. It may be in the form of a memory support of ROM- or RAM-type, or a hard disk drive.

The invention also encompasses a method itself for converting the texture data from the first compression format to the second compression format, by implementing an algorithm with at least one index-combining operation executed at index-level, for deriving the at least one feature of the texture data block within the second compression format from the set of first index values of the texture data block within the first compression format.

A first implementation of the invention method may be used when the first index values of the texture data block in the first compression format form an index matrix with two reference directions, and the feature of the texture data block in the second compression format comprises a flipped or non-flipped orientation with respect to these reference directions. It applies when two reference colors are also contained in the texture data block for the first compression format. According to this first implementation, this orientation may be derived from a comparison between two color gradient values which are calculated from the index matrix and the reference colors of the texture data block in the first compression format, respectively along both reference directions. In particular, this may be performed by executing the following steps:

/a1/ converting each first index value of the index matrix of the texture data block in the first compression format, into a calculation-adapted index value;

/a2/ dividing the index matrix into two matrix chunks with respect to a first one of the reference directions, and calculating two average-representing index values respectively for the two matrix chunks based on the calculation-adapted index values, then calculating an average color for each matrix chunk by interpolating between the reference colors based on the average-representing index value of this matrix chunk, and then calculating the color gradient value for the first reference direction as a difference between both average color values;

/a3/ repeating step /a2/ with respect to the second one of the reference directions; and /a4/ selecting one of the flipped and non-flipped orientations for the texture data block converted into the second compression format depending on whether the color gradient value is longer for the first or the second reference direction used in step /a2/ or /a3/.

In this first implementation, the operations which are executed at index-level are the calculations of the two average representing index values respectively for the two matrix chunks, and this for each reference direction.

In step /a2/, the average-representing index value may be any index value which has a meaning and computation effectiveness which are equivalent to those of the actual average index value calculated for each matrix chunk. For example, each average index value may indeed be replaced equivalently with the sum of the first index values of the matrix chunk concerned, because the number of first index values considered for all chunks is constant, and therefore does not alter the result of step /a4/.

In step /a2/ again, the calculation of the average color for each matrix chunk by interpolating between the reference colors based on the average index value of this matrix chunk may be performed using the three RGB coordinates for defining each color. Then, the interpolation is applied for each RGB coordinate separately, using the same average index value for obtaining the average color value of each matrix chunk.

Step /a4/ may be performed by comparing the lengths of both color gradient values which relate respectively to the first and second reference directions. Any norm may be used for such length comparison, including the Euclidian norm where each color gradient length is computed as the sum of three squared RGB-coordinates of this color gradient. Another norm possible which may be used alternatively is for example the Manhattan norm, where each color gradient length is computed as the sum of the respective absolute values of the three RGB-coordinates of this color gradient.

A second implementation of the invention method may be used alternatively to the first one when the first index values of the texture data block in the first compression format form again an index matrix with two reference directions, and the feature of the texture data block in the second compression format also comprises a flipped or non-flipped orientation with respect to these reference directions. According to this second implementation, this orientation may be derived from a comparison between two index gradient values which are calculated from the index matrix of the texture data block in the first compression format, respectively along both reference directions. In particular, the following steps may be performed:
/a1'/ converting each first index value of the index matrix of the texture data block in the first compression format, into a calculation-adapted index value;
/a2'/ dividing the index matrix into two matrix chunks with respect to a first one of the reference directions, and calculating two average-representing index values respectively for the two matrix chunks based on the calculation-adapted index values, and then calculating the index gradient value for the first reference direction as a difference between both average-representing index values;
/a3'/ repeating step /a2'/ with respect to the second one of the reference directions; and
/a4'/ selecting one of the flipped and non-flipped orientations for the texture data block converted into the second compression format depending on whether the index gradient value is higher for the first or the second reference direction used in step /a2'/ or /a3'/.

In this second implementation, the whole determination of the flipped or non-flipped orientation is performed at index-level, without handling any color values encoded with color bit-length. Thus, step /a4'/ is directly performed by comparing index gradient values instead of color gradient values.

In step /a2'/, each average index value may be replaced again with the sum of the first index values of the matrix chunk concerned, because the number of first index values considered for all chunks is constant, and therefore does not alter the result of step /a4'/.

In these first and second implementations, the converting of each first index value into a calculation-adapted index value and the calculating of the average-representing index value for the each matrix chunk may be performed at a same time by reading out the average-representing index value from a lookup table using the first index values contained in this matrix chunk as entries into the lookup table. Thus, the lookup table appears as the operation table for the index-combining operation acting directly from the first index values.

A first improvement of the invention method may be implemented when each texture data block in the second compression format comprises second index values suitable for calculating color values. The method may then further comprise the following steps for converting the texture data block into the second compression format:
/b1/ calculating color values respectively for several second index values using the second compression format;
/b2/ calculating a color value for at least one first index value using the first compression format, and assigning one of the second index values to the first index value, based on minimum color difference between the first index value and each of the second index values used in step /b1/;
/b3/ storing the second index value assigned in connection with the first index value; and
/b4/ each time the texture data block contains the first index value in the first compression format, using the second index value stored in connection with this first index value for the texture data block converted into the second compression format.

Thus, a direct translation is implemented at index-level for obtaining the second index values pertaining to the second compression format, from the first index values pertaining to the first compression format.

A second improvement of the invention method may be implemented when the texture data block in the second compression format comprises second index values, at least one base color value and at least one codeword value, and when the second compression format provides several tables, one of which is selected using the codeword value, and each table assigns one color modifier value to each second index value. Then a color value may be calculated for the texture data block in the second compression format by combining the base color value of this texture data block with the color modifier value, wherein the color modifier value is obtained by selecting from a table of color modifier values using the second index value for the pixel; and wherein the table is selected by the codeword of the texture data block. But the codeword which decides which table to be associated with the texture data block needs to be selected beforehand. To this end, the codeword value of the texture data block may be determined by minimizing a total error between the color values which are calculated respectively in the first and second compression formats for this texture data block when varying the codeword value of the texture data block.

These improvements may be implemented separately from each other or in combination with one another, and possibly with each one of the first and second method implementations described here-above.

In addition, the computer-executable instructions which are stored on the computer-readable storage medium of the invention may be suitable for implementing any one of these method improvements.

In particular, the first compression format may be based on DXT1, and the second compression format may be based on ETC1.

BRIEF DESCRIPTION OF THE DRAWINGS

FIGS. 4 and 5 show a possible format for DXT1-compressed texture data block.

FIG. 6 exhibits an example of C-code instructions used for an exemplary implementation of the invention.

FIG. 8 displays an operation table which may be used in an alternative implementation of the invention.

DETAILED DESCRIPTION OF THE INVENTION

In FIGS. 1 to 3b, each pair of neighboring crosses within a box denotes a 2-bit placeholder adapted for holding a binary index value.

Figure 1:
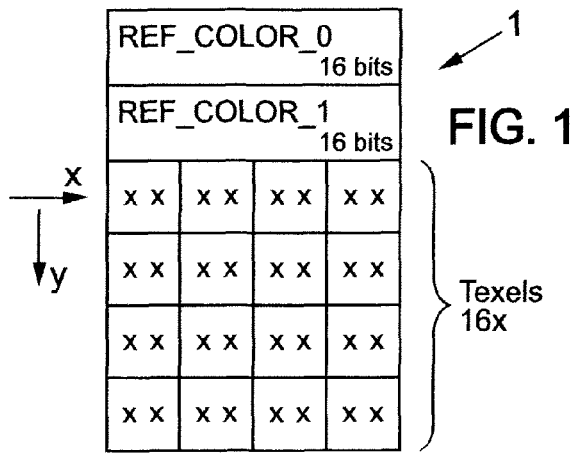
FIG. 1 is a representation of the bit sequence for encoding a texture data block using DXT1 compression format.

According to FIG. 1, a texture data block encoded in DXT1 compression format comprises two reference colors each encoded using a 16-bit word and denoted REF_COLOR_0 and REF_COLOR_1. It also comprises sixteen bit pairs each for designating separately one color and called texel. Thus, each texel can have one out of the four values 00; 01; 10 and 11. These texel values for DXT1 compression format have been called first index values in the general part of this specification. According to DXT1 compression format, texel values 00 and 01 indicate respectively the reference colors REF_COLOR_0 and REF_COLOR_1, directly for the texels with these values:

COLOR (00)=REF_COLOR_0, and

COLOR (01)=REF_COLOR_1.

Both reference colors REF_COLOR_0 and REF_COLOR_1 may vary depending on the texture data block considered, and allow calculation of additional colors using the texel values 10 and 11. When REF_COLOR_0 is higher than REF_COLOR_1, then the colors associated with the texel values 10 and 11 are interpolated between REF_COLOR_0 and REF_COLOR_1 in the following manner:

COLOR (10)=REF_COLOR_0×2/3+REF_COLOR_1×1/3 and

COLOR (11)=REF_COLOR_0×1/3+REF_COLOR_1×2/3.

The sixteen texels of the DXT1-compressed texture data block form a 4×4 index matrix as shown in the representation of FIG. 1, with matrix directions to be identified with x- and y-reference directions in the image displayed.

Reference number 1 denotes the texture data block in DXT1 compression format as a whole.

Figure 2:
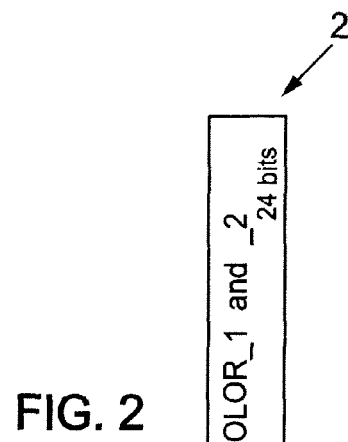
FIG. 2 is a representation of the bit sequence for encoding a texture data block using ETC1 compression format.

According to FIG. 2, a texture data block encoded in ETC1 compression format is denoted 2 as a whole and comprises:

two base colors encoded all together using 24 bits, and denoted respectively BASE_COLOR_1 and BASE_COLOR_2;

two table codewords each encoded using 3 bits, and denoted respectively TABLE_CODEWORD_1 and TABLE_CODEWORD_2;

sixteen bit pairs each for encoding a separate texel color, and called second index values in the general part of this specification;

one bit denoted diffbit for indicating one out of two possible encoding modes used for the base colors: two separate set of three RGB color values corresponding respectively to BASE_COLOR_1 and BASE_COLOR_2, or one set of three RGB color values corresponding to BASE_COLOR_1 and another set of three RGB values for the color difference BASE_COLOR_2−BASE_COLOR_1; and one more bit denoted flipbit for indicating an orientation used for encoding the texture data block in ETC1 compression format.

Basically, both encoding modes for the two ETC1 base colors are equivalent with respect to the principle of the present invention, so that no further attention is drawn on this concern.

Figure 3A:
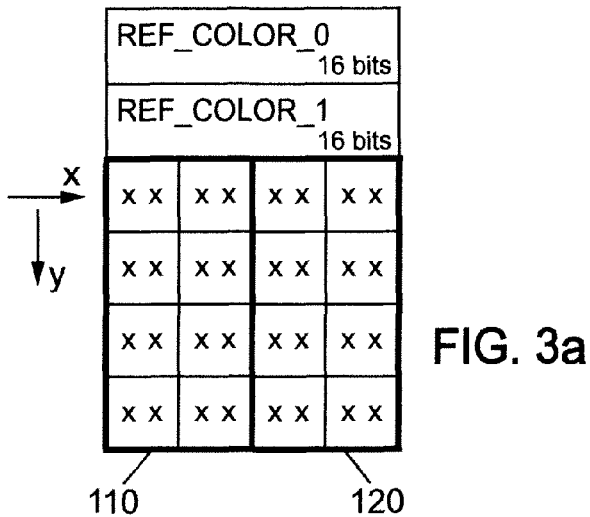
FIGS. 3a and 3b illustrate two alternative orientations possible for an ETC1-compressed texture data block.
Figure 3B:
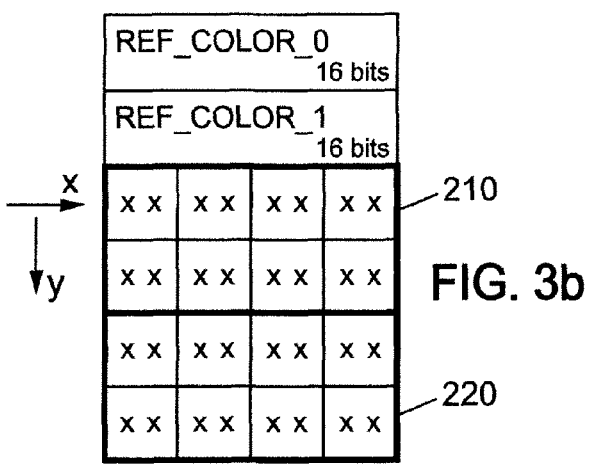

The function of the flipbit is now explained with respect to FIGS. 3a and 3b. The assignment of both base colors and both table codewords in ETC1 compression format to a 4×4 index matrix may be performed in accordance with two alternative modes, which are identified by their respective orientations. These are called non-flipped and flipped orientations, and correspond respectively to FIGS. 3a and 3b.

The texels of the ETC1-compressed texture data block 2 correspond respectively to those of the DXT1-compressed texture data block 1 with respect to the locations within the index matrix either with non-flipped orientation (FIG. 3a) or flipped orientation (FIG. 3b). For each orientation, BASE_COLOR_1 with TABLE_WORDCODE_1 relate to the texels contained in one half of the 4×4 index matrix, and BASE_COLOR_2 with TABLE_WORDCODE_2 relate to the texels of the remaining index matrix half. These complementary halves of the index matrix correspond to the matrix chunks in the general part of the specification. They are denoted 110 and 120 for the non-flipped orientation, corresponding to 0-value for the flipbit, or denoted 210 and 220 for the flipped orientation, corresponding to 1-value for the flipbit.

Then, for each one of the two matrix chunks relating to one and same orientation, the corresponding value for the table codeword enables to select one table of color modifier values among a set of eight alternative tables which are provided by the ETC1 compression format. Each table assigns a value of color modifier to each one of the four texel values possible. Therefore, the color value of any texel in the ETC1-compressed texture data block can be calculated by combining the base color of the chunk containing this texel with the color modifier value which corresponds to the texel value, within the table identified for this chunk. Because the color calculation process for each texel is different between DXT1 and ETC1 compression formats, the base color values of the ETC1-compressed texture data block 2 are somewhat different in general from the reference color values of the DXT1-compressed texture data block 1, although the texture data block is the same one before compression in either format.

Therefore, for converting a texture data block from DXT1- to ETC1 compression format, the values of the flipbit, the base colors, the codewords and the values of the texels in ETC1 compression format are to be determined from the values of the DXT1-compressed texture data block. One possible implementation of the invention for that is now described as a non-limiting example. With this example, DXT1- and ETC1 compression format correspond respectively to first and second compression format introduced in the general part of this specification.

Starting with a DXT1-compressed texture data block, one has to select at first which one of the non-flipped or flipped orientation is more appropriate for ETC1-encoding the same texture data block. To this purpose, the 4×4 index matrix may be tentatively divided according to non-flipped orientation, and a color average value is estimated for each one of the two chunks 110 and 120. Then, a color gradient value may be calculated by difference between both color average values. Similar calculation may also be executed for the flipped orientation, and both color gradient values are compared. The non-flipped or flipped orientation which corresponds to the highest color gradient value is then assigned to the ETC1-compressed texture data block.

According to the invention, such calculations for selecting the flipbit value may be limited to index-level, so as to avoid handling 16-bit color values. But the first index values described earlier for the DXT1 compression format have not been designed initially for allowing arithmetic operations using them directly as operation terms. An index translation may then be performed, according to the following translation table:

| First index value | calculation-adapted index value | Color value |
| --- | --- | --- |
| 0 0 | 0 0 | REF_COLOR_0 |
| 0 1 | 1 1 | REF_COLOR_1 |
| 1 0 | 0 1 | COLOR (1, 0) |
| 1 1 | 1 0 | COLOR (1, 1) |

Such index translation corresponds to the following software computation, when A and B denote respectively the most significant bit (left bit) and the least significant (right) bit in a bit pair:

calculation-adapted_index (A)=first_index (B), and calculation-adapted_index (B)=first_index (B) xor first_index (A).

Thus, the calculation-adapted index values 00, 01, 10 and 11 appear with a sorting order similar to the alignment order of REF_COLOR_0, COLOR (1, 0), COLOR (1, 1) and REF_COLOR 1 in a color representation diagram, for example RGB diagram. Then linear calculations using directly the calculation-adapted index values have some significance with respect to calculations executed with the color values, when replacing each color value with the corresponding calculation-adapted index value. For this reason, the arithmetic sum of the calculation-adapted index values over the eight texels of each chunk may be used as the average color value for this chunk.

Figures 4, 6:
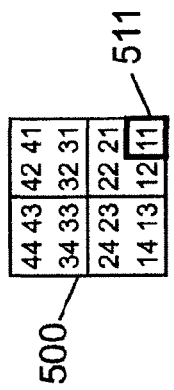

As shown in FIGS. 4 and 5, the first index values for each 4×4 block are stored in a 32-bit data string called 'in' as shown in 501. For instance, the first two bits 510 denoted $\hat{a}_{11}$ and $\hat{b}_{11}$ represent the first index value for the bottom right pixel of the block 511. Here $\hat{a}_{11}$ denotes the most significant first index bit and $\hat{b}_{11}$ denotes the least significant first index bit. In one embodiment, the first index values stored in the 32-bit data string 501 are converted to a 32-bit data string of calculation-adapted index values called 'out' 502 using the following C-code:

```
out_a = (in << 1) & 0xaaaaaaaa;
out_b = (in ^ (in >> 1)) & 0x55555555;
out = out_a | out_b;
``` where & denotes bitwise AND, ^ denotes bitwise XOR, | denotes bitwise OR, << denotes leftwards shift, and >> denotes rightward shift. In 'out' 502, the first two bits are $a_{11}$ and $b_{11}$, where $a_{11}$ denotes the most significant bit of the calculation-adapted index of 511, and $b_{11}$ denotes the least significant bit.

The sum of the calculation-adapted indices is now calculated for each quarter-block. For instance, to calculate the sum of the calculation-adapted indices for the bottom right quarter of the block 500, the indices corresponding to the pixels 22, 21, 12 and 11 (FIG. 4) should be added together. Denote the calculation-adapted index for pixel 11 $i_{11}$. Now, $i_{11}$, consists of the two bits $a_{11}b_{11}$, and we can calculate the sum ass_botright=$i_{11}+i_{12}+i_{21}+i_{22}$. This can be carried out using the following C-code:

```
sum1 = (out & 0x00cc00cc) + ((out >> 8) & 0x00cc00cc);
sum2 = (out & 0x33003300) + ((out << 8) & 0x33003300);
res = (sum1 >> 2) + (sum2 >> 8);
```

After these operations, 's_botright' is located in bits 23 . . . 20 in 'res' with reference number 503. As is shown FIG. 5, the sums for the other quarter-blocks will also reside in 'res' as a result of the calculation above. For instance, to calculate the sum of the calculation-adapted indices in the bottom half of the block 500, we should add together 's_botleft' and 's_botright' to get the sum 'sumbot'. This can be carried out using the following C-code:

sumbot=((res>>20) & 0xf)+((res>>16) & 0xf);

Likewise, the sum of the calculation-adapted indices for the top-, left- and right-halves of the block can be calculated using the following C-code:

```
sumright = ((res >> 20) & 0xf) + ((res >> 4) & 0xf));
sumleft  = ((res >> 16) & 0xf) + (res & 0xf));
sumtop   = ((res >> 4) & 0xf) + (res & 0xf));
```

In summary, all the code necessary to calculate the sums in the different half-blocks is shown in FIG. 6.

It is now possible to calculate the average color in the left half-block using sumleft. For instance, the red component can be calculated as:

avg_col_left[0] = ((24 − sumleft) * REF_COLOR_0[0] +sumleft* REF_COLOR_1[0])/24;

Likewise, the green and blue components can be calculated as:

```
avg_col_left[1] = ((24 − sumleft) * REF_COLOR_0[1]
    +sumleft* REF_COLOR_1[1])/24;
avg_col_left[2] = ((24 − sumleft) * REF_COLOR_0[2]
    +sumleft* REF_COLOR_1[2])/24;
```

The average color of the right-, top- and bottom-half blocks can be calculated analogously using 'sumright', 'sumtop' and 'sumbot' respectively.

Once we have calculated the average colors, we can see which flip orientation is suitable. If there is a large discrepancy between the left and right colors, this means that the left and right half-blocks are very different and it makes sense to split the block in a left part and a right part. Hence we can choose a left/right flip direction if the difference between the left and the right half is bigger than the difference between the top and the bottom halves. Let diff_left_right[k] denote the difference between the left and right average color:

```
diff_left_right[0] = avg_col_left[0] − avg_col_right[0];
diff_left_right[1] = avg_col_left[1] − avg_col_right[1];
diff_left_right[2] = avg_col_left[2] − avg_col_right[2];
```

Also, let diff_top_bot denote the difference between the top and bottom average colors:

```
diff_top_bot[0] = avg_col_top[0] − avg_col_bot[0];
diff_top_bot[1] = avg_col_top[1] − avg_col_bot[1];
diff_top_bot[2] = avg_col_top[2] − avg_col_bot[2];
```

Now we can check which distance is bigger:

```
if( SQ(diff_left_right[0]) + SQ(diff_left_right[1]) +
    SQ(diff_left_right[2])
    > SQ(diff_top_bot[0]) + SQ(diff_top_bot[1]) +
    SQ(diff_top_bot[2]))
{
flipbit = 0; // left/right flip orientation;
}
else
{
flipbit = 1; // top/bot flip orientation;
}
```

Here SQ( ) denotes the computing the square of a number; $SQ(x)=x*x$.

If the Manhattan norm is to be used instead of the Euclidian norm, the condition in C++ code becomes:

```
if( abs(diff_left_right[0]) + abs(diff_left_right[1])
    + abs(diff_left_right[2])
    >abs(diff_top_bot[0]) + abs(diff_top_bot[1])
    +abs(diff_top_bot[2]))
``` with abs( ) denoting the absolute value of the argument number.

However, a quicker but equivalent way of selecting the flip bit exists. All the average colors avg_col_top[k], avg_col_bot[k], avg_col_left[k] and avg_col_right[k] lie on the line between REF_COLOR_0[k] and REF_COLOR_1[k], where [k] denote the color coordinate vector with k equal to 0, 1 or 2 for labeling the color coordinates in the RGB system for example. For instance, the left and right average colors can be written as:

$$avg\_col\_left[k]=REF\_COL\_0[k]+t1*(REF\_COL\_1[k]-REF\_COL\_0[k])$$

$$avg\_col\_right[k]=REF\_COL\_0[k]+t2*(REF\_COL\_1[k]-REF\_COL\_0[k])$$

where t1=(sumleft/24) and t2=(sumright/24). This is recognized by a person skilled in the art to be two instances of the line equation; hence avg_col_left[k] lies on a straight line between REF_COL_0 and REF_COL_1. Furthermore, as can also be seen from the two expressions, the distance between avg_col_left and avg_col_right is proportional to the absolute difference between t1 and t2. Hence we can compare which distance is greater; left-right or top-bottom, by comparing the differences abs(sumleft/24−sumright/24) and abs(sumtop/24−sumbot/24). For the comparison, the factor 24 is irrelevant and we can use the following code to select the flip direction:

```
if( abs(sumleft−sumright) > abs(sumtop−sumbot) )
{
flipbit = 0; // left/right flip orientation;
}
else
{
flipbit = 1; // top/bot flip orientation;
}
```

Note that this way of calculating the flip bit produces the same result as the previous way, but is much quicker, since the actual colors (avg_col_left, avg_col_right, avg_col_top and avg_col_bot) do not need to be calculated. Also we do not need to calculate the differentials diff_left_right[k] and diff_top_bot[k].

Figure 7:
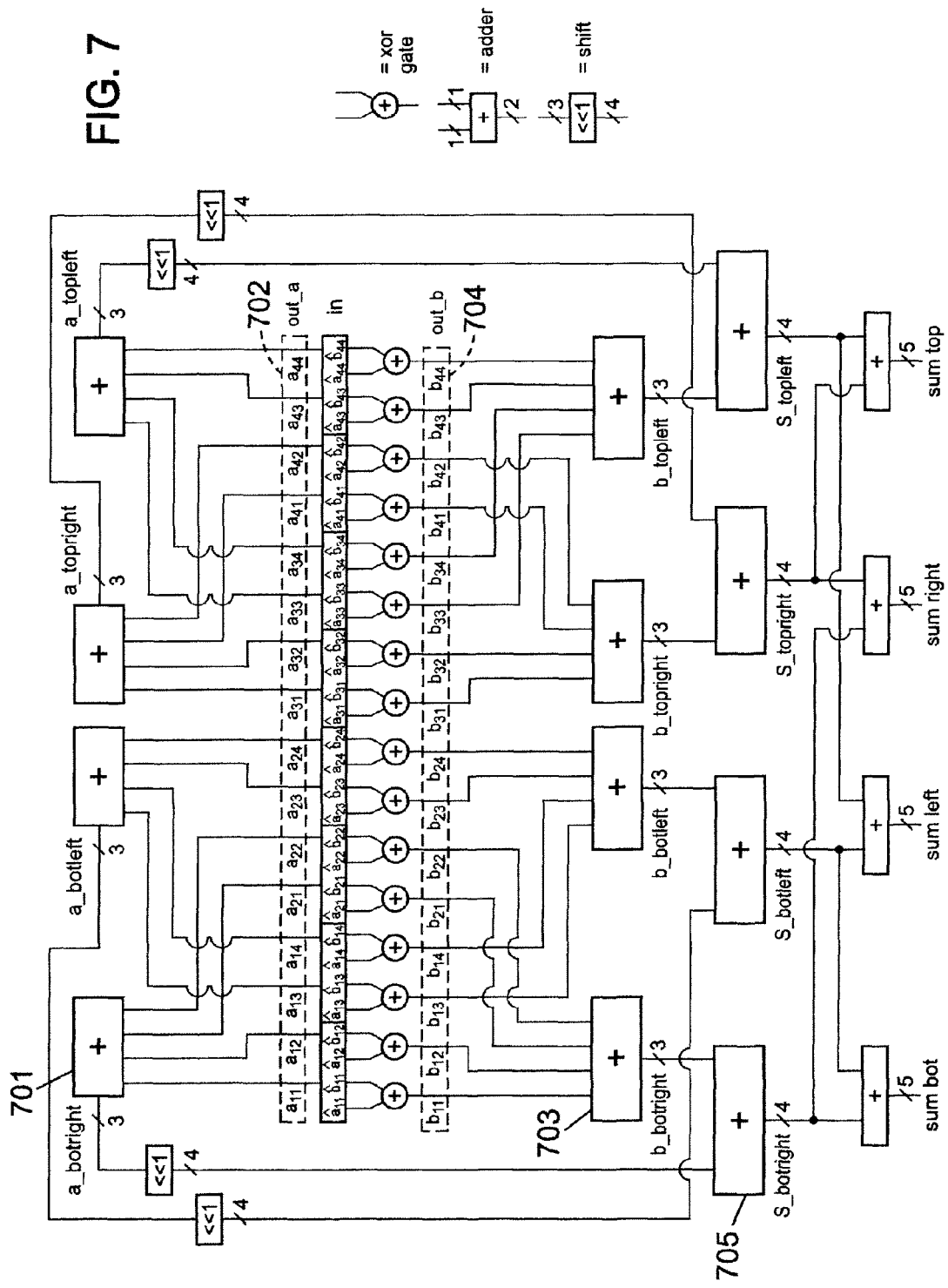
FIG. 7 displays a possible hardware used in an implementation of the invention.

The sums of the indices of the quarterblocks such as s_botright can be calculated in other ways. For instance, the a-bits for a specific region can be added together using $a\_botright=a_{11}+a_{12}+a_{21}+a_{22}$, and the b-bits for a specific region can likewise be added together using $b\_botright=b_{11}+b_{12}+b_{21}+b_{22}$. Since the a-bits are twice as much worth as the b-bits the final value s_botright can be recovered as s_botright=(a_botright<<1)+b_botright. This can be written in C-code using:

```
a_botright = sumbits( out & 0xa0a00000);
b_botright = sumbits( out & 0x50500000);
s_botright = (a_botright<< 1) + b_botright;
``` where sumbits(x) calculates the number of non-zero bits in x. Unfortunately it is not very efficient to implement a function such as sumbits(x) using the assembly instructions typically found on CPU's, CPU's or DSP's, so this way of calculating s_botright may not be efficient. However, if custom hardware is built, an efficient implementation is possible. This is illustrated in FIG. 7, where the single 4-way 1-bit adder 701 is calculating a_botright by selecting the appropriate parts of the out_a variable 702 and performing a sum of the bits. Likewise, the adder 703 performs the sum of the carefully selected bits from out_b (704) to calculate b_botright. They are combined in the adder 705.

A third way to calculate the values s_botright, s_botleft, s_topright and s_topleft is to process two or more pixels at the same time. For instance, if we look at pixels 11 and 12 in block 500 in FIG. 4, we see that the corresponding four bits $â_{11}$, $b̂_{11}$, $â_{12}$ and $b̂_{12}$ lie next to each other in the 32-bit word 'in' (501). We can treat these four bits as one 4-bit piece of information $d=â_{11}b̂_{11}â_{12}b̂_{12}$. For each such d, there will be a corresponding sum. Assume for instance that d equals 6. This means that d=0110 binary which means that $\hat{a}_{11}=0$, $\hat{b}_{11}=1$, $\hat{a}_{12}=1$ and $\hat{b}_{12}=0$, as can be seen line marked with 801 in the table in FIG. 8. This in turn means that the calculation-adapted indices must be equal to $a_{11}=1$, $b_{11}=1$, $a_{12}=0$ and $b_{12}=1$, as can be seen in the next column of the same line in FIG. 8. This also means that the respective indices must be 3 and 1, and the sum 4. Hence we can create a table called convert_and_sum table where we store such pre-calculated data. On position 6 in the table we hence store the sum 4. The entire table is equal to the last column in the table in FIG. 8. Using this table, we can calculate the sums in the quarter-blocks the following way:

```
botright   = convert_and_sum[in >> 28];
botright  += convert_and_sum[(in >> 20) & 0xf];
topright   = convert_and_sum[(in >> 12) & 0xf];
topright  += convert_and_sum[(in >>  4) & 0xf];
botleft    = convert_and_sum[(in >> 24) & 0xf];
botleft   += convert_and_sum[(in >> 16) & 0xf];
topleft    = convert_and_sum[(in >>  8) & 0xf];
topleft   += convert_and_sum[(in & 0xf)];
sumleft   = topleft + botleft;
sumright  = topright + botright;
sumtop    = topleft + topright;
sumbot    = botleft + botright;
```

This way of calculating sumleft, sumright, sumtop and sumbot may be more efficient in some architectures where fetching memory is quick. In other architectures where memory fetches are expensive, it may be more efficient to use the calculation outlined in FIG. 5 than to use a look-up table such as convert_and_sum.

Once the orientation of the ETC1-compressed texture data block has been determined, one of the ETC1 color modifier tables may be selected for each one of the two chunks. To this end, the four colors corresponding to the DXT1 texel values are calculated for the texture data block, using the reference colors REF_COLOR_0 and REF_COLOR_1. In addition, using each one of ETC1 color modifier tables, four color are calculated corresponding to the four ETC1-texel values with determining the optimum ETC1 base colors, in order to match as close as possible the four DXT1 colors. A total error may then be calculated for each ETC1 color modifier table, which is a measurement of the mismatch between the four DXT1 colors possible from the reference colors of the DXT1-compressed texture data block, and the ETC1 colors resulting from the table used. According to a possible improvement, this total error may take into account the frequency of each DXT1 texel value in the chunk considered. For example, once a correspondence has been set between four ETC1 colors obtained from a color modifier table and the four DTC1 colors, color module-difference may be calculated for each pair of corresponding DXT1/ETC1 colors, then multiplicated by the frequence of the corresponding DXT1 index value in the chunk of the DXT1-compressed texture data block, and summed all four together for obtaining the total error. The one of the eight color modifier tables which leads to the minimum total error is then assigned to the chunk, by writing the corresponding table codeword value in the ETC1-compressed texture data block. The same process is also performed for the other chunk for determining the second codeword value.

Finally, the index value of each texel of the ETC1-compressed texture data block may be determined, based on the corresponding texel value of the texture data block in DXT1 compression format. To this end, the color values may be calculated for all four ETC1 texel values, from the base color and the color modifier table identified for the chunk of concern. Then, one of the ETC1 texel values may be selected for each value of the DXT1 texels, by minimizing the difference between the color value calculated from the selected ETC1 texel value in accordance with the ETC1 compression format on one hand, and the color value calculated from the DXT1 texel value in accordance with the DXT1 compression format on the other hand. A one-entry table may then be constructed and stored, which assigns the selected ETC1 texel values respectively to the corresponding DXT1 texel values. This latter table may be used thereafter for converting directly, i.e. at index-level, the DXT1 texel values of the texture data block into ETC1 texel values. Possibly, the table for converting DXT1- to ETC1 texel values may be completed only for those of the DXT1 texel values which are actually present in the DXT1-compressed texture data block.

Once the texture data block has been fully converted from DXT1- to ETC1 compression format, it may be decompressed in accordance with this latter format. Such a conversion between texture compression formats is beneficial when the device is optimized for implementing ETC1 decompression. Such a benefit arises in particular when the device has been designed for executing ETC1 decompression with hardware implementation.

The invention claimed is:

1. A non-transitory computer-readable storage medium storing computer-executable instructions, which when executed, cause one or more processors to convert texture data from a first compression format to a second compression format; by:
    receiving the texture data in the first compression format, wherein the texture data in the first compression format includes a texture data block comprising a set of first index values for calculating color values, and a bit number allocated in the first compression format for encoding each first index value being less than a color bit-length used for encoding one color value, wherein the first index values of the texture data block in the first compression format form an index matrix with two reference directions, and wherein a feature of a texture data block in the second compression format comprises a flipped or non-flipped orientation with respect to the two reference directions;
    deriving the orientation from a comparison between two gradient values calculated from the index matrix of the texture data block in the first compression format, respectively along both reference directions; and
    deriving at least one feature of the texture data block within the second compression format from the set of first index values of said texture data block within the first compression format by using at least one index-combining operation executed at index-level, wherein the first compression format is based on DXT1, and the second compression format is based on ETC1.

2. The non-transitory computer-readable storage medium according to claim 1, wherein the derivation of the feature of the texture data block within the second compression format from the set of first index values of said texture data block within the first compression format, is performed only by executing operations at index-level, without handling color values encoded with the color bit-length.

3. The non-transitory computer-readable storage medium according to claim 1, wherein two reference colors are also contained in the texture data block for the first compression format, and wherein the deriving of the orientation of the texture data block in the second compression format comprises:

/a1/ converting each first index value of the index matrix of the texture data block in the first compression format, into a calculation-adapted index value;

/a2/ dividing the index matrix into two matrix chunks with respect to a first one of the reference directions, and calculating two average-representing index values respectively for the two matrix chunks based on the calculation-adapted index values, then calculating an average color for each matrix chunk by interpolating between the reference colors based on the average-representing index value of said matrix chunk, and then calculating the color gradient value for the first reference direction as a difference between both average color values;

/a3/ repeating step /a2/ with respect to the second one of the reference directions; and /a4/ selecting one of the flipped and non-flipped orientations for the texture data block converted into the second compression format depending on whether the color gradient value is longer for the first or the second reference direction used in step /a2/ or /a3/.

4. The non-transitory computer-readable storage medium according to claim 1, wherein the deriving of the orientation of the texture data block in the second compression format comprises:

/a1'/ converting each first index value of the index matrix of the texture data block in the first compression format, into a calculation-adapted index value;

/a2'/ dividing the index matrix into two matrix chunks with respect to a first one of the reference directions, and calculating two average-representing index values respectively for the two matrix chunks based on the calculation-adapted index values, and then calculating an index gradient value for said first reference direction as a difference between both average-representing index values;

/a3'/ repeating step /a2'/ with respect to the second one of the reference directions; and /a4'/ selecting one of the flipped and non-flipped orientations for the texture data block converted into the second compression format depending on whether the index gradient value is higher for the first or the second reference direction used in step /a2'/ or /a3'/.

5. The non-transitory computer-readable storage medium according to claim 3, wherein the conversion of each first index value into a calculation-adapted index value and the calculation of the average-representing index value for the each matrix chunk are performed at a same time by reading out said average-representing index value from a lookup table using the first index values contained in said matrix chunk as entries into the lookup table.

6. The non-transitory computer-readable storage medium according to claim 1, wherein each texture data block in the second compression format comprises second index values for calculating color values, and wherein conversion of the texture data block into the second compression format comprises:

/b1/ calculating color values respectively for several second index values using the second compression format;

/b2/ calculating a color value for at least one first index value using the first compression format, and assigning one of the second index values to said first index value, based on minimum color difference between said first index value and each of the second index values used in step /b1/;

/b3/ storing the second index value assigned in connection with the first index value; and /b4/ each time the texture data block contains the first index value in the first compression format, using the second index value stored in connection with said first index value for said texture data block converted into the second compression format.

7. The non-transitory computer-readable storage medium according to claim 1, wherein the texture data block in the second compression format comprises second index values, at least one base color value, and at least one codeword value, the second compression format providing several tables each identified by one codeword value and assigning one color modifier value to each second index value, a color value being calculated for the texture data block in the second compression format by combining the base color value of said texture data block with the color modifier value from the table identified by the codeword value of said texture data block, and which is assigned to said second index value, wherein selecting for said texture data block that of the codeword values minimizing a total error between the color values calculated respectively in the first and second compression formats for said texture data block comprises tentatively varying the codeword value of the texture data block.

8. The non-transitory computer-readable storage medium according to claim 1, wherein the non-transitory computer-readable storage medium is incorporated in a mobile phone or touchpad device.

9. A method for converting texture data from a first compression format to a second compression format, the method comprising:

receiving the texture data in the first compression format, wherein the texture data in the first compression format includes a texture data block in the first compression format comprising a set of first index values for calculating color values, and a bit number allocated in the first compression format for encoding each first index value being less than a color bit-length used for encoding one color value, wherein the first index values of the texture data block in the first compression format form an index matrix with two reference directions, and wherein a feature of a texture data block in the second compression format comprises a flipped or non-flipped orientation with respect to the two reference directions;

deriving the orientation from a comparison between two gradient values calculated from the index matrix of the texture data block in the first compression format, respectively along both reference directions; and deriving at least one feature of the texture data block within the second compression format from the set of first index values of said texture data block within the first compression format by using at least one index-combining operation executed at index-level, wherein the first compression format is based on DXT1, and the second compression format is based on ETC1.

10. The method according to claim 9, wherein the feature of the texture data block within the second compression format is derived from the set of first index values of said texture data block within the first compression format, only by executing operations at index-level, without handling color values encoded with the color bit-length.

11. The method according to claim 9, wherein two reference colors are also contained in the texture data block for the first compression format, said method comprising the following steps for deriving the orientation of the texture data block in the second compression format:
/a1/ converting each first index value of the index matrix of the texture data block in the first compression format, into a calculation-adapted index value;
/a2/ dividing the index matrix into two matrix chunks with respect to a first one of the reference directions, and calculating two average-representing index values respectively for the two matrix chunks based on the calculation-adapted index values, then calculating an average color for each matrix chunk by interpolating between the reference colors based on the average-representing index value of said matrix chunk, and then calculating the color gradient value for the first reference direction as a difference between both average color values;
/a3/ repeating step /a2/ with respect to the second one of the reference directions; and
/a4/ selecting one of the flipped and non-flipped orientations for the texture data block converted into the second compression format depending on whether the color gradient value is longer for the first or the second reference direction used in step /a2/ or /a3/.

12. The method according to claim 9, comprising the following steps for deriving the orientation of the texture data block in the second compression format:
/a1'/ converting each first index value of the index matrix of the texture data block in the first compression format, into a calculation-adapted index value;
/a2'/ dividing the index matrix into two matrix chunks with respect to a first one of the reference directions, and calculating two average-representing index values respectively for the two matrix chunks based on the calculation-adapted index values, and then calculating an index gradient value for said first reference direction as a difference between both average-representing index values;
/a3'/ repeating step /a2'/ with respect to the second one of the reference directions; and
/a4'/ selecting one of the flipped and non-flipped orientations for the texture data block converted into the second compression format depending on whether the index gradient value is higher for the first or the second reference direction used in step /a2'/ or /a3'/.

13. The method according to claim 11, wherein the converting of each first index value into a calculation-adapted index value and the calculating of the average-representing index value for the each matrix chunk are performed at a same time by reading out said average-representing index value from a lookup table using the first index values contained in said matrix chunk as entries into the lookup table.

14. The method according to claim 9, wherein each texture data block in the second compression format comprises second index values for calculating color values, and
wherein the method further comprises the following steps for converting the texture data block into the second compression format:
/b1/ calculating color values respectively for several second index values using the second compression format;
/b2/ calculating a color value for at least one first index value using the first compression format, and assigning one of the second index values to said first index value, based on minimum color difference between said first index value and each of the second index values used in step /b1/;
/b3/ storing the second index value assigned in connection with the first index value; and
/b4/ each time the texture data block contains the first index value in the first compression format, using the second index value stored in connection with said first index value for said texture data block converted into the second compression format.

15. The method according to claim 9, wherein the texture data block in the second compression format comprises second index values, at least one base color value and at least one codeword value,
the second compression format providing several tables each identified by one codeword value and assigning one color modifier value to each second index value,
a color value being calculated for the texture data block in the second compression format by combining the base color value of said texture data block with the color modifier value from the table identified by the codeword value of said texture data block, and which is assigned to said second index value,
wherein the codeword value of the texture data block is determined by minimizing a total error between the color values calculated respectively in the first and second compression formats for said texture data block, when tentatively varying the codeword value of said texture data block.

* * * * *